United States Patent
Hikichi

(10) Patent No.: US 10,536,600 B2
(45) Date of Patent: Jan. 14, 2020

(54) PRINTING APPARATUS CAPABLE OF HOLDING RECEIVED PRINT JOB AND CONTROL METHOD OF PRINTING APPARATUS

(71) Applicant: CANON KABUSHIKI KAISHA, Tokyo (JP)

(72) Inventor: Atsushi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/109,492

(22) Filed: Aug. 22, 2018

(65) Prior Publication Data

US 2018/0367692 A1 Dec. 20, 2018

Related U.S. Application Data

(63) Continuation of application No. 15/204,748, filed on Jul. 7, 2016, now Pat. No. 10,104,257.

(30) Foreign Application Priority Data

Jul. 10, 2015 (JP) .................................. 2015-138892

(51) Int. Cl.
*G06F 15/00* (2006.01)
*G06F 3/12* (2006.01)
*G06K 1/00* (2006.01)
*H04N 1/00* (2006.01)
*H04N 1/113* (2006.01)

(52) U.S. Cl.
CPC ....... *H04N 1/00896* (2013.01); *G06F 3/1213* (2013.01); *G06F 3/1221* (2013.01); *G06F 3/1229* (2013.01); *G06F 3/1255* (2013.01); *G06F 3/1267* (2013.01); *G06F 3/1285* (2013.01); *H04N 1/00931* (2013.01); *H04N 1/113* (2013.01); *H04N 2201/0094* (2013.01); *Y02D 10/1592* (2018.01)

(58) Field of Classification Search
CPC .......... H04N 1/00896; H04N 1/00931; H04N 1/113; H04N 2201/0094; G06F 3/1213; G06F 3/1221; G06F 3/1229; G06F 3/1255; G06F 3/1267; G06F 3/1285
USPC ....................................... 358/1.13, 1.15, 1.1
See application file for complete search history.

(56) References Cited

U.S. PATENT DOCUMENTS

| | | | |
|---|---|---|---|
| 9,319,551 B2 * | 4/2016 | Kobayashi | G03G 15/5004 |
| 9,571,673 B2 * | 2/2017 | Inaba | H04N 1/00204 |
| 2012/0262751 A1 | 10/2012 | Inaba | |
| 2014/0153028 A1 | 6/2014 | Kanakubo | |

(Continued)

FOREIGN PATENT DOCUMENTS

| | | |
|---|---|---|
| JP | 2008181402 A | 8/2008 |
| JP | 2012156706 A | 8/2012 |
| JP | 2015104867 A | 6/2015 |

*Primary Examiner* — Douglas Q Tran
(74) *Attorney, Agent, or Firm* — Canon U.S.A., Inc. IP Division

(57) ABSTRACT

A printing apparatus includes a printer unit that prints an image on a sheet, a network controller that instructs the printer unit to execute a preparation operation according to receipt of print data, and a controller that instructs the printer unit to execute the preparation operation according to input of an execution instruction in a case where a reservation function for reserving printing based on the print data received by the network controller until receipt of the execution instruction is received is enabled.

18 Claims, 14 Drawing Sheets

(56) References Cited

U.S. PATENT DOCUMENTS

2016/0210094 A1\* 7/2016 Nishikawa ............ G06F 3/1267
2017/0177283 A1\* 6/2017 Tsuchiya ............... G06F 3/1238

\* cited by examiner

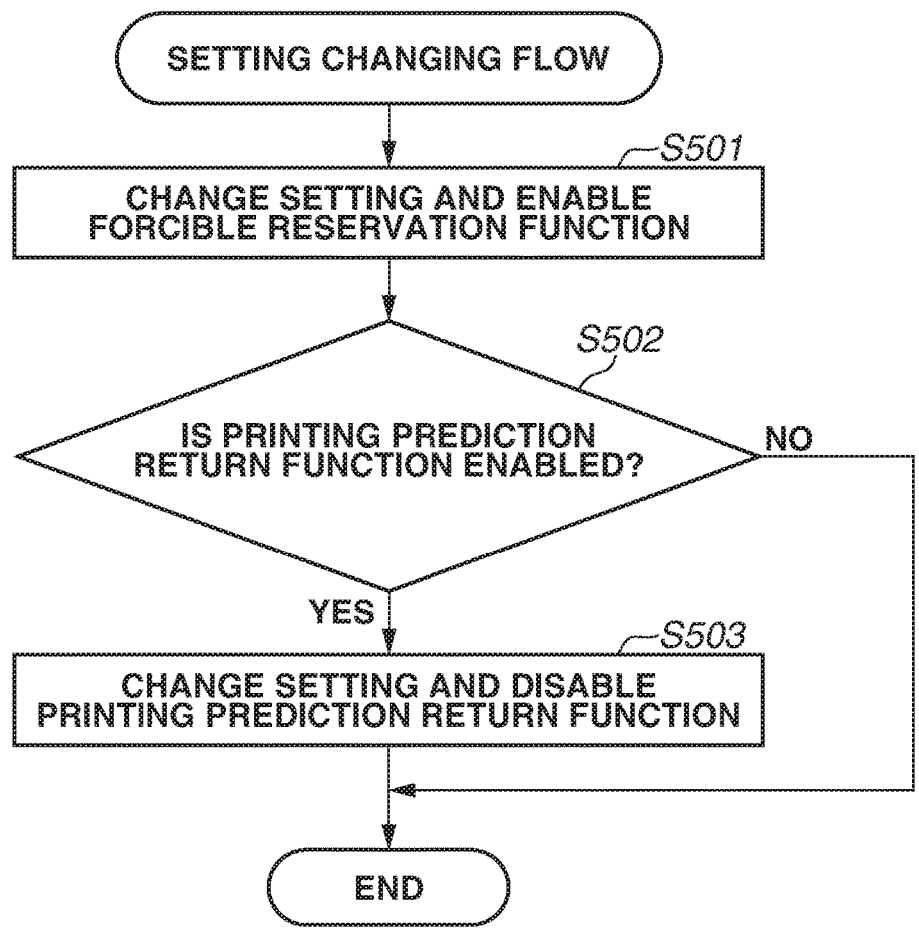

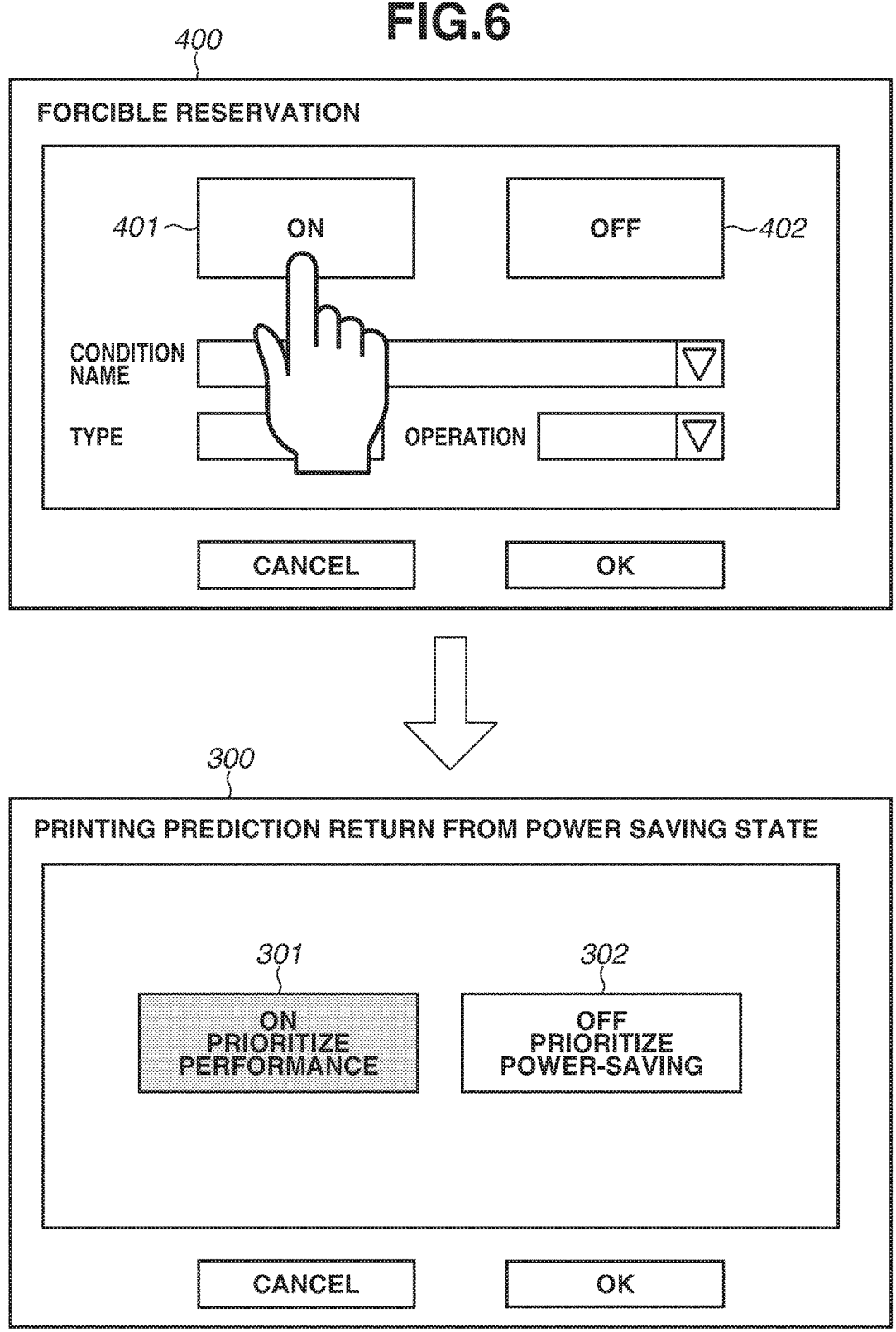

PRINTING APPARATUS CAPABLE OF HOLDING RECEIVED PRINT JOB AND CONTROL METHOD OF PRINTING APPARATUS

CROSS-REFERENCE TO RELATED APPLICATIONS

This application is a continuation of U.S. patent application Ser. No. 15/204,748 filed on Jul. 7, 2016, which claims the benefit of Japanese patent application No. 2015-138892 filed Jul. 10, 2015, all of which are hereby incorporated by reference herein in their entirety.

BACKGROUND

Field

Aspects of the present invention generally relate to a printing apparatus that returns from a power saving state based on receipt of print data from an external apparatus and to a control method of the printing apparatus.

Description of the Related Art

When a printing apparatus is not in use power saving is realized by shifting the printing apparatus to a power saving state where power supply to a printer unit or a controller for controlling the printer unit is stopped. When the printing apparatus returns from the power saving state to execute printing, various preparation operations of the printer unit, such as increasing a temperature of a fixing device and driving a polygon mirror, are necessary.

In a conventional printing apparatus, a preparation operation of a printer unit is executed after activation of a controller because the controller determines whether to execute printing based on data when the data is received. Thus, a long delay can occur until the printer unit executes printing after a network controller receives the print data. As such, a printing prediction return function is known as a technique for reducing the amount of time until the printer unit starts printing after the network controller receives the print data. The printing prediction return function causes the network controller to determine whether the print data is received and to control the preparation operation of the printer unit without waiting for activation of the controller. More specifically, as discussed in Japanese Patent Application Laid-Open No. 2012-222753, the network controller determines whether received data is print data based on a port number specified by the received data, and executes the preparation operation of the printer unit if the received data is the print data.

However, even if the received data is the print data, there is a case where the preparation operation of the printer unit does not have to be executed promptly. For example, the received print data can be reserved in the printing apparatus, and the printing can be executed later when a user inputs an execution instruction of the print data. In a case where the print data is reserved in the printing apparatus, a printed material is not output until the user inputs the execution instruction of the print data. Accordingly, unless the user inputting the print data promptly acquires a printed material, the preparation operation of the printer unit is unnecessary if the preparation operation thereof is executed in advance.

Because the network controller discussed in Japanese Patent Application Laid-Open No. 2012-222753 determines whether the received data is the print data and controls execution of the preparation operation of the printer unit, the preparation operation of the printer unit is executed even if the print data is to be reserved in the printing apparatus. Thus, if the user inputting the print data does not promptly issue the execution instruction of the print data, the preparation operation is unnecessarily executed.

SUMMARY

Aspects of the present invention are directed to a printing apparatus that prevents a printer unit from executing an unnecessary preparation operation in a case where print data transmitted from an external apparatus is reserved in the printing apparatus.

According to an aspect of the present invention, a printing apparatus includes a printer unit configured to print an image on a sheet, a controller configured to control the printer unit, a network controller configured to receive a print job for causing the printer unit to execute printing in a power saving state where power supply to the printer unit and the controller is stopped, and a power control unit configured to control power supply to the printer unit, wherein the power control unit changes a time when power is supplied to the printer unit based on a setting that reserves the print job in the printing apparatus before input of an execution instruction with respect to the print job.

Further features of aspects of the present invention will become apparent from the following description of exemplary embodiments with reference to the attached drawings.

BRIEF DESCRIPTION OF THE DRAWINGS

FIG. 5 is a flowchart illustrating processing for changing setting of the printing prediction return function.

FIG. 6 is a diagram illustrating a state where a button for enabling the printing prediction return function is brought into an unselectable state.

DESCRIPTION OF THE EMBODIMENTS

Hereinafter, a first exemplary embodiment of the present invention will be described with reference to the appended drawings.

Configuration of Printing Apparatus

Figure 1:
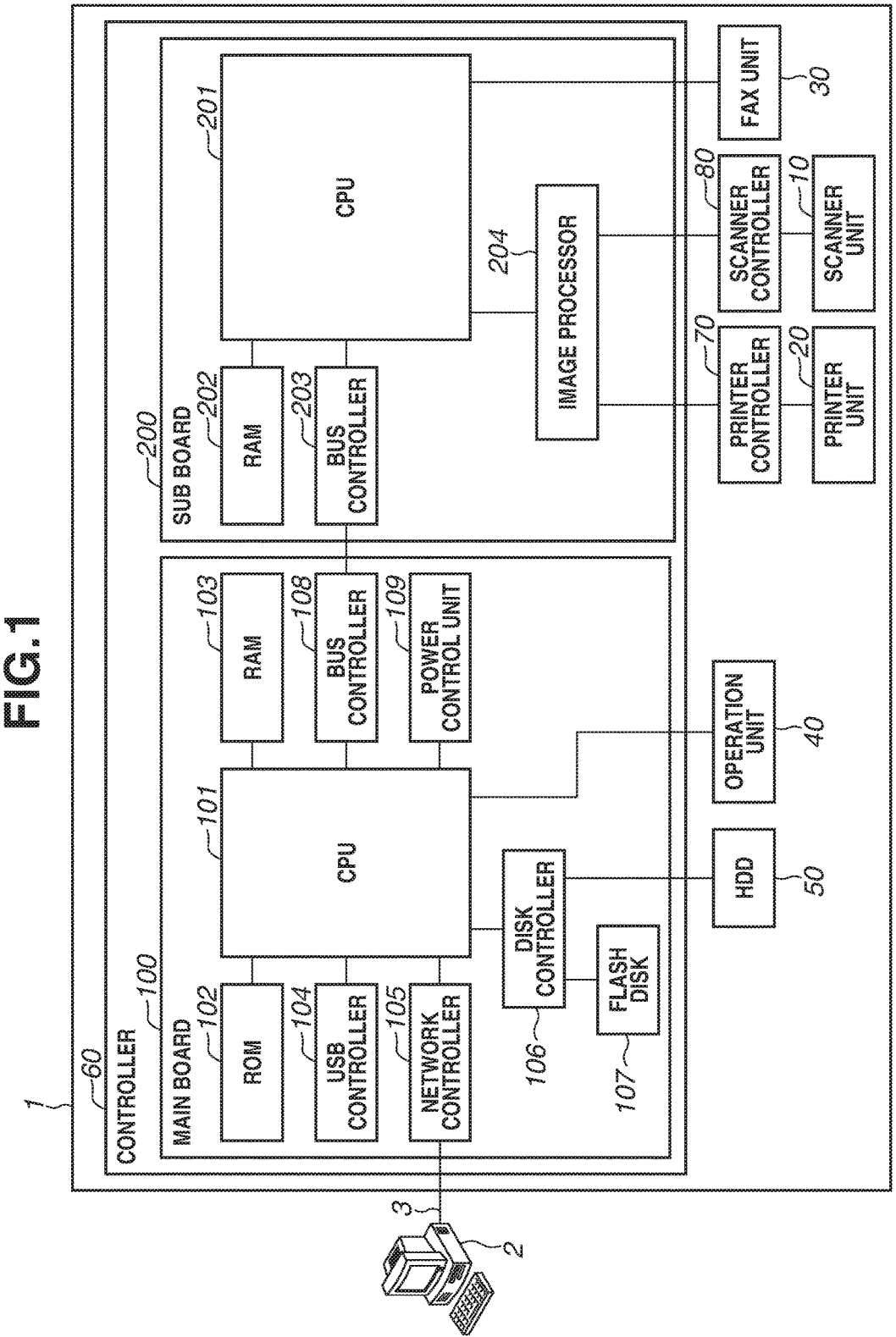
FIG. 1 is a block diagram illustrating a configuration of a printing apparatus.

FIG. 1 is a block diagram illustrating a configuration of a printing apparatus 1.

The printing apparatus 1 is communicably connected to an external apparatus 2 via a local area network (LAN) 3. The external apparatus 2 transmits print data to the printing apparatus 1 via a printer driver installed in the external apparatus 2. One or more external apparatuses 2 can be connected to the printing apparatus 1.

The printing apparatus 1 includes a scanner unit 10, a printer unit 20, a fax unit 30, an operation unit 40, a hard disk drive (HDD) 50, a controller 60, a printer controller 70, and a scanner controller 80. The scanner unit 10 optically reads an image from an original document and converts the read image into digital image data. The printer unit 20 prints an image on a sheet by using the digital image data. The fax unit 30 transmits and receives facsimile data via a telephone line. The operation unit 40 includes a hard key for providing an instruction about a number of print copies or start of a copying operation, and a display unit for displaying a screen for selecting the above functions provided by the printing apparatus 1 or a screen for displaying a state of the printing apparatus 1. The HDD 50 stores digital image data and a control program. The controller 60 is connected to the scanner unit 10, the printer unit 20, the operation unit 40, the HDD 50, and the fax unit 30, and controls respective modules.

The printing apparatus 1 according to the present exemplary embodiment is a multifunction peripheral (MFP) including the functions described below.

Copy Function:

A function for printing an image on a sheet by using digital image data of an image of an original document read by the scanner unit 10.

Image Transmission Function:

A function for transmitting digital image data of an image read by the scanner unit 10 to the external apparatus 2 via the LAN 3.

Image Storing Function:

A function for storing digital image data of an image read by the scanner unit 10 in the HDD 50.

Image Printing Function (Printing Function):

A function for printing an image on a sheet via the printer unit 20 based on print data (e.g., print data described in page-description language) transmitted from the external apparatus 2.

Further, the printing apparatus 1 according to the present exemplary embodiment includes a printing prediction return function and a forcible reservation function in addition to the above-described basic functions of the MFP.

Printing Prediction Return Function:

In a power saving state where power supply to the printer unit 20 is stopped, a printing prediction return function causes the network controller 105 to determine whether data received from the external apparatus 2 is print data and to cause the printer unit 20 to execute a preparation operation. In comparison with the case where the controller 60 causes the printer unit 20 to execute the preparation operation, the printer unit 20 can execute the preparation operation without waiting for activation of the controller 60. With this configuration, it is possible to shorten the time it takes the printing apparatus 1 to return from the power saving state to start printing. The network controller 105 determines that the received data is print data if a destination port number of the data received from the external apparatus 2 is a port 9100 for a RAW protocol or a port 515 for a line printer daemon (LPR) protocol.

Forcible Reservation Function:

The forcible reservation function temporarily reserves a print job generated based on the print data transmitted from the external apparatus 2 in the printing apparatus 1. Printing based on the reserved print job is executed when the user inputs an execution instruction of the print job via the operation unit 40. The printing based on the print job can be restricted by setting a password with respect to the print job so that the printing will not be executed unless the user inputs the password. When the forcible reservation function is enabled in the printing apparatus 1, the print job is reserved in the printing apparatus 1 without an instruction for reserving the print job in the printing apparatus 1 provided by a printer driver of the external apparatus 2.

Next, the controller 60 will be described in detail.

The controller 60 includes a main board 100 and a sub-board 200.

The main board 100 is a so-called general-purpose central processing unit (CPU) system. A CPU 101, a read only memory (ROM) 102 that stores a boot program, a random access memory (RAM) 103 that serves as a work memory of the CPU 101, a universal serial bus (USB) controller 104 that controls a USB, and the network controller 105 are arranged on the main board 100. Further, a flash disk 107 such as a solid state drive (SSD), a disk controller 106 that controls the flash disk 107 or the HDD 50, a bus controller 108 having a bridge function for connecting to an external bus, and a power control unit 109 are arranged on the main board 100.

The power control unit 109 controls power supply to the units included in the printing apparatus 1. The power control unit 109 is configured of a complex programmable logic device (CPLD). An interrupt signal is input to the power control unit 109 from the operation unit 40, the fax unit 30, or the network controller 105. In a case where a return factor is detected when the printing apparatus 1 is in a power saving state, the power control unit 109 causes the printing apparatus 1 to return to a normal power state from the power saving state. The return factor can be detected when the operation unit 40 is operated, the fax unit 30 receives facsimile data, or the network controller 105 receives a wake-on-LAN (WOL) packet.

The sub-board 200 is a comparatively small-sized general-purpose CPU system and includes an image processor 204 for executing image processing. A CPU 201, a RAM 202 serving as a work memory of the CPU 201, a bus controller 203 having a bridge function for connecting to an external bus, and the image processor 204 are arranged on the sub-board 200.

Herein, an operation of the controller 60 will be described by taking a copy function as an example.

When the user selects a copy function to input an execution instruction of the copy function via the operation unit 40, the CPU 101 transmits an image-reading instruction to the scanner unit 10 via the CPU 201. The scanner unit 10 optically reads an original document and generates the digital image data of an image of the original document. The digital image data is input to the image processor 204 via the scanner controller 80. The image processor 204 performs direct memory access (DMA) transfer and temporarily stores the digital image data in a memory (not illustrated).

When all or a certain amount of digital image data is stored in the memory, the CPU 201 provides an image-output instruction to the printer unit 20 while notifying the image processor 204 of an address of the digital image data stored in the memory. The digital image data stored in the memory is transmitted to the printer unit 20 via the image processor 204 and the printer controller 70 according to a synchronization signal transmitted from the printer unit 20.

Then, the printer unit 20 prints an image on a sheet based on the digital image data.

Power Source Configuration

Figure 2:
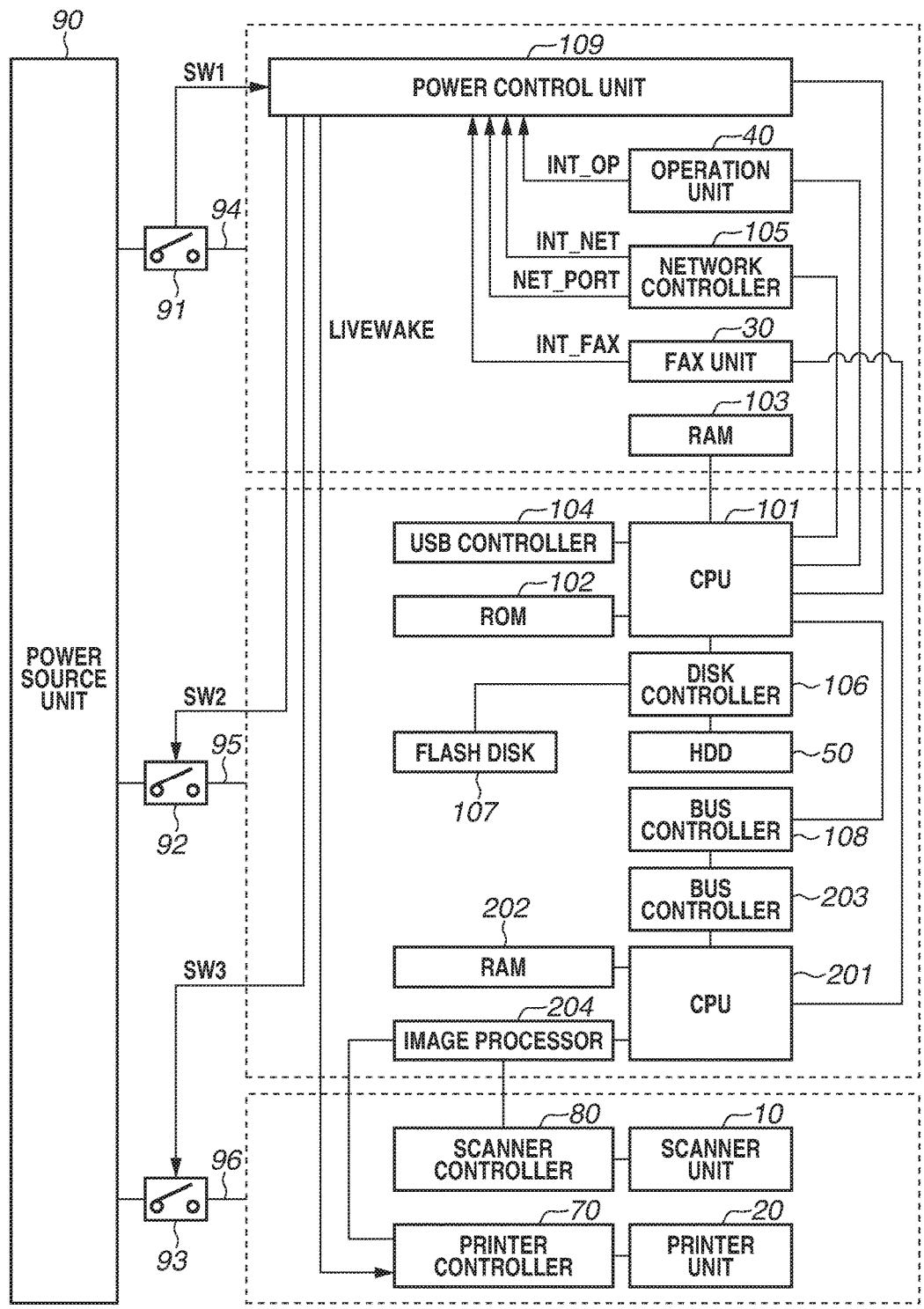
FIG. 2 is a block diagram illustrating a power source configuration of the printing apparatus.

FIG. 2 is a block diagram illustrating a power source configuration of the printing apparatus 1 illustrated in FIG. 1.

A power source unit 90 generates a first power, a second power, and a third power from power supplied via a plug. The first power is supplied to the power control unit 109, the operation unit 40, the fax unit 30, the network controller 105, and the RAM 103 via a first power source line 94. The second power is supplied to the CPU 101, the ROM 102, the USB controller 104, the disk controller 106, and the HDD 50 via a second power source line 95. Further, the second power is supplied to the flash disk 107, the bus controller 108, the CPU 201, the RAM 202, the bus controller 203, and the image processor 204 via the second power source line 95. The third power is supplied to the scanner controller 80, the scanner unit 10, the printer controller 70, and the printer unit 20 via a third power source line 96.

A power saving state is a state where the second power and the third power are not supplied to the printing apparatus 1 although the first power is supplied thereto. In other words, when the printing apparatus 1 is in the power saving state, although the power is supplied to the power control unit 109, the operation unit 40, the fax unit 30, the network controller 105, and the RAM 103, power supply to the other units is stopped.

Further, a normal power state is a state where the first power, the second power, and the third power are supplied to the printing apparatus 1. In other words, the power is supplied to respective units included in the printing apparatus 1.

A switch 91, a switch 92, and a switch 93 are respectively arranged on the first power source line 94, the second power source line 95, and the third power source line 96. When the printing apparatus 1 is in the power saving state, the switch 91 is turned on while the switches 92 and 93 are turned off.

The switch 91 is a rocker switch that is turned on or off according to the operation of the user. Further, the switches 92 and 93 are relay switches that are controlled by the power control unit 109.

The power control unit 109 controls a signal SW2 to turn the switch 92 on or off. Further, the power control unit 109 controls a signal SW3 to turn the switch 93 on or off.

Various interrupt signals are input to the power control unit 109. When the interrupt signal is input to the power control unit 109, the power control unit 109 causes the printing apparatus 1 to return to the normal power state from the power saving state. More specifically, an interrupt signal INT_OP is input to the power control unit 109 from the operation unit 40. When the user operates the operation unit 40, the operation unit 40 outputs the interrupt signal INT_OP. Further, an interrupt signal INT_FAX is input to the power control unit 109 from the fax unit 30. When the fax unit 30 receives facsimile data, the fax unit 30 outputs the interrupt signal INT_FAX. Furthermore, an interrupt signal INT_NET is input to the power control unit 109 from the network controller 105. When the network controller 105 receives a WOL packet from the external apparatus 2, the network controller 105 outputs the interrupt signal INT_NET.

When any one of the above interrupt signals INT_OP, INT_FAX, and INT_NET is input to the power control unit 109, the power control unit 109 controls the signals SW2 and SW3 to turn on the switches 92 and 93. With this configuration, the printing apparatus 1 returns to the normal power state from the power saving state.

Further, a signal NET_PORT is input to the power control unit 109 from the network controller 105. When the network controller 105 receives print data, the network controller 105 outputs the signal NET_PORT.

Further, the power control unit 109 controls a LIVE-WAKE signal input to the printer controller 70. When the above-described signal NET_PORT is input to the power control unit 109, the power control unit 109 does not output the LIVEWAKE signal. When the power is supplied to the printer controller 70 while the LIVEWAKE signal is not input thereto, the printer controller 70 controls the printer unit 20 to execute the preparation operation. The preparation operation of the printer unit 20 is an operation that is to be executed before the printer unit 20 starts printing, and the operation includes at least any one of a temperature adjustment operation of the fixing device, a rotation operation of the polygon mirror, a rotation operation of the fan for discharging heat, and a rotation operation of the photosensitive drum.

Further, the power control unit 109 also does not output the LIVEWAKE signal that is to be input to the printer controller 70 when the above-described interrupt signal INT_FAX is input to the power control unit 109. Accordingly, printing based on the facsimile data can be executed because the preparation operation of the printer unit 20 is executed if the fax unit 30 receives the facsimile data.

Further, when the above-described interrupt signal INT_OP is input to the power control unit 109, the power control unit 109 outputs the LIVEWAKE signal that is to be input to the printer controller 70. Accordingly, when the user operates the operation unit 40, the preparation operation of the printer unit 20 is not executed. With this configuration, it is possible to prevent the printer unit 20 from executing the preparation operation at the time when the function used by the user has not yet determined.

As described above, the printer unit 20 executes the preparation operation when the fax unit 30 receives the facsimile data or the network controller 105 receives the print data. On the other hand, the printer unit 20 does not execute the preparation operation when the network controller 105 receives a WOL packet that is not the print data or the operation unit 40 is operated by the user.

Control of Printing Apparatus 1 in Activation

Activation processing of the printing apparatus 1 will be described. The user turns on the switch 91 when the printing apparatus 1 in a power off state is to be used. The power control unit 109 monitors a state of the switch 91 (i.e., state of the signal SW1), and respectively turns on the switches 92 and 93 by controlling the signals SW2 and SW3 when the switch 91 is turned on. With this configuration, the printing apparatus 1 returns to the normal power state from the power off state. The printer unit 20 and the scanner unit 10 to which the power is supplied start executing the preparation operation. In addition, the preparation operation of the scanner unit 10 can be an operation for moving a document reading head to a home position.

Control of Printing Apparatus 1 when Returning from Power Saving State

Subsequently, returning processing of the printing apparatus 1 from the power saving state will be described.

When the printing apparatus 1 detects a return factor (i.e., operation of the operation unit 40, receipt of facsimile data or a WOL packet) in the power saving state, the printing apparatus 1 returns to the normal power state from the power saving state.

When the operation unit 40 is operated by the user, the interrupt signal INT_OP is output to the power control unit 109 from the operation unit 40. The power control unit 109 controls the signals SW2 and SW3 to turn on the switches 92 and 93 when the interrupt signal INT_OP is input thereto. Further, the power control unit 109 outputs the LIVEWAKE signal when the interrupt signal INT_OP is input thereto. With this configuration, the printer controller 70 to which the power is supplied does not execute the preparation operation of the printer unit 20 because the LIVEWAKE signal is input thereto.

When the fax unit 30 receives the facsimile data, the interrupt signal INT_FAX is output to the power control unit 109 from the fax unit 30. The power control unit 109 controls the signals SW2 and SW3 to turn on the switches 92 and 93 when the interrupt signal INT_FAX is input thereto. Further, the power control unit 109 does not output the LIVEWAKE signal when the interrupt signal INT_FAX is input thereto. With this configuration, the printer controller 70 to which the power is supplied executes the preparation operation of the printer unit 20.

When the network controller 105 receives the print data, the interrupt signal INT_NET and the signal NET_PORT are output to the power control unit 109 from the network controller 105. The power control unit 109 controls the signals SW2 and SW3 to turn on the switches 92 and 93 when the interrupt signal INT_NET is input thereto. Further, the power control unit 109 does not output the LIVEWAKE signal when the signal NET_PORT is input thereto. With this configuration, the printer controller 70 to which the power is supplied executes the preparation operation of the printer unit 20.

Further, when the network controller 105 receives the WOL packet other than the print data (e.g., a packet for inquiring about a state of the printing apparatus 1), the interrupt signal INT_NET is output from the network controller 105 while the signal NET_PORT is not output therefrom. The power control unit 109 controls the signals SW2 and SW3 to turn on the switches 92 and 93 when the interrupt signal INT_NET is input thereto. Further, the power control unit 109 outputs the LIVEWAKE signal because the signal NET_PORT is not input thereto. With this configuration, the printer controller 70 to which the power is supplied does not execute the preparation operation of the printer unit 20.

Further, in the present exemplary embodiment, although the power is supplied to the scanner unit 10 when the printing apparatus 1 receives the print data or the facsimile data, power supply to the scanner unit 10 does not have to be executed.

Control of Printing Apparatus 1 when Shifting to Power Saving State

When a shifting condition of the power saving state is satisfied in the normal power state, the printing apparatus 1 shifts to the power saving state. The shifting condition can be satisfied when the operation unit 40 is not operated by the user for a certain period whereas the network controller 105 does not receive the WOL packet for a certain period. Further, the shifting condition is not limited to the above, and can be satisfied when the user presses a shift button for the power saving state provided on the operation unit 40, or time has reached set time.

The CPU 101 that detects the shifting condition notifies the power control unit 109 of a shift to the power saving state. The power control unit 109 that receives the notification controls the signals SW2 and SW3 to turn off the switches 92 and 93. With this configuration, the printing apparatus 1 shifts to the power saving state.

Setting Screen of Printing Prediction Return Function

Figure 3:
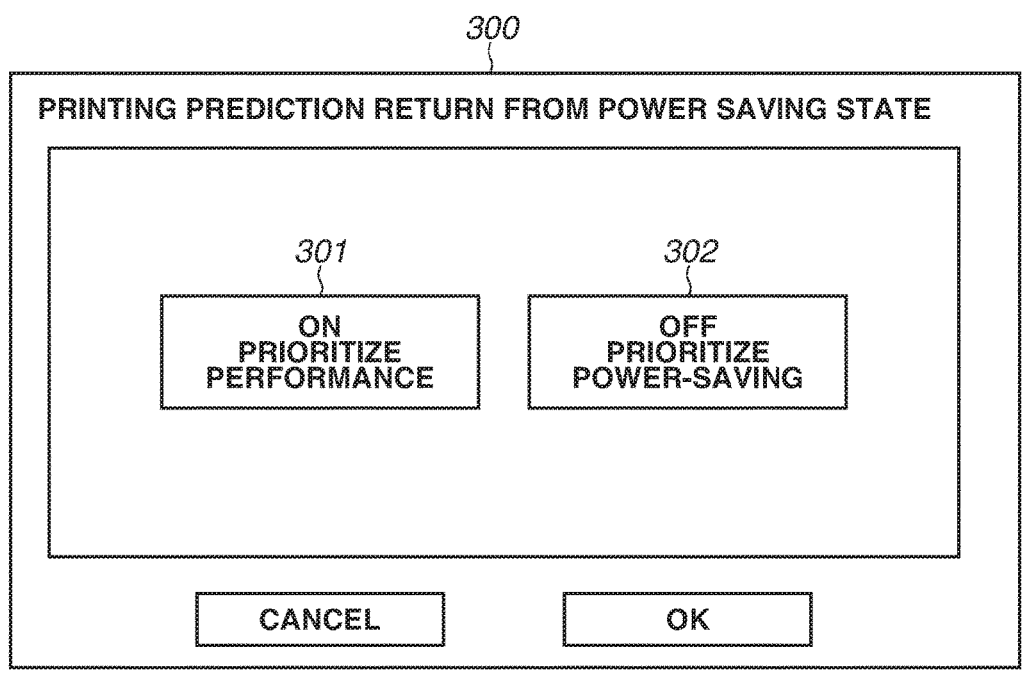
FIG. 3 is a diagram illustrating a screen for setting a printing prediction return function.

FIG. 3 is a diagram illustrating a screen 300 for setting the printing prediction return function displayed on a display unit of the operation unit 40. The user can set the printing prediction return function to be enabled or disabled via the screen 300. The printing prediction return function is enabled when the user touches an ON button 301 whereas the printing prediction return function is disabled when the user touches an OFF button 302 on the screen 300 in FIG. 3. If the printing prediction return function is enabled, the preparation operation of the printer unit 20 can be executed in advance without waiting for activation of the controller 60. On the other hand, if the printing prediction return function is disabled, the printer unit 20 can be prevented from unnecessarily executing the preparation operation when the controller 60 cannot generate the print job.

Setting Screen of Forcible Reservation Function

Figure 4:
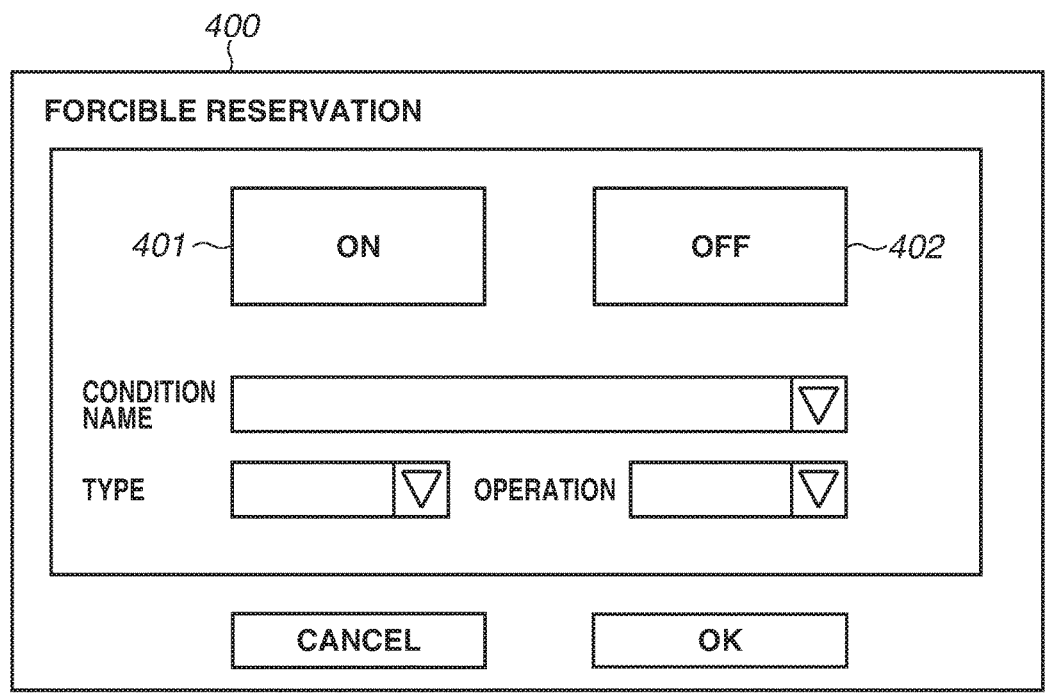
FIG. 4 is a diagram illustrating a screen for setting a forcible reservation function.

FIG. 4 is a diagram illustrating a screen 400 for setting the forcible reservation function displayed on the display unit of the operation unit 40. The user can set the forcible reservation function to be enabled or disabled via the screen 400. The forcible reservation function is enabled when the user touches an ON button 401 whereas the forcible reservation function is disabled when the user touches an OFF button 402 on the screen 400 in FIG. 4. If the forcible reservation function is enabled, the printing apparatus 1 reserves the print job without printing. Then, in a state where the print job is reserved, if an execution instruction of the print job is received from the user via the operation unit 40, the printer unit 20 executes printing based on the reserved print job. On the other hand, if the forcible reservation function is disabled, printing based on the print job is automatically executed without receiving the execution instruction from the user. In addition, setting of the forcible reservation function can be changed to enable or disable the forcible reservation function for each user.

Processing for Changing Printing Prediction Return Function Setting Based on Forcible Reservation Function Setting FIG. 5 is a flowchart illustrating processing for changing setting of the printing prediction return function based on setting of the forcible reservation function.

In the present exemplary embodiment, when the forcible reservation function is enabled, setting of the printing prediction return function is changed and the printing prediction return function is disabled. This is because the print job is executed based on the input of the execution instruction of the user when the forcible reservation function is enabled. In other words, the print job will not be executed unless the user who inputs the print data promptly goes to the printing apparatus 1 to input the execution instruction. When the forcible reservation function is enabled, the print job will not be executed according to the input of the print data. Thus, if the preparation operation of the printer unit 20 is executed based on the receipt of the print data, the preparation operation can be unnecessary. Accordingly, in the present exemplary embodiment, the setting of the printing prediction return function is changed and the printing prediction return function is disabled when the forcible reservation function is enabled. The operation will be described below in detail.

When the user selects the ON button 401 on the screen 400 illustrated in FIG. 4, in step S501, the CPU 101 changes setting of the forcible reservation function and enables the forcible reservation function. Then, in step S502, the CPU 101 determines whether the printing prediction return function is enabled. When the printing prediction return function is enabled (YES in step S502), the processing proceeds to step S503. In step S503, the CPU 101 changes setting of the printing prediction return function and disables the printing prediction return function. On the other hand, when the printing prediction return function is disabled (NO in step S502), the CPU 101 does not make any changes.

As illustrated in FIG. 6, when the user enables the forcible reservation function, the ON button 301 for enabling the printing prediction return function is displayed in gray and brought into an unselectable state.

Operation when Printing Prediction Return Function is Enabled

Figure 7A:
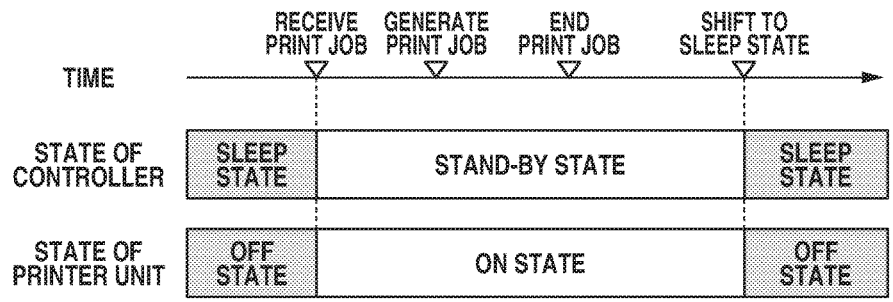
FIGS. 7A, 7B, and 7C are time charts illustrating changes in states of the printing apparatus that receives print data.

FIG. 7A is a time chart of an operation when the printing prediction return function is enabled.

In the present exemplary embodiment, the printing prediction return function is disabled when the forcible reservation function is enabled, whereas in the below-described example, the printing prediction return function is enabled because the forcible reservation function is disabled.

In the time chart of FIG. 7A, the print data is received from the external apparatus 2 when the printing apparatus 1 is in the power saving state. When the printing apparatus 1 is in the power saving state, the controller 60 is in the sleep state whereas the printer unit 20 is in the OFF state. The sleep state is a state where power is supplied to a part of the controller (i.e., power control unit 109, RAM 103, and network controller 105) whereas power supply to the other units is stopped.

When the network controller 105 receives the print data from the external apparatus 2, the controller 60 returns from the sleep state to become the stand-by state whereas the printer unit 20 returns from the OFF state to become the ON state. The stand-by state of the controller 60 is a state where power is supplied to respective units of the controller 60. Further, when the printer unit 20 becomes the ON state, power is supplied to the printer unit so that the printer unit 20 executes the preparation operation.

The controller 60 to which the power is supplied generates a print job based on the print data and executes printing based on the print job. Then, when the shifting condition of the power saving state is satisfied, the printing apparatus 1 shifts to the power saving state. In the power saving state, the controller 60 becomes the sleep state whereas the printer unit 20 becomes the OFF state.

When the printing prediction return function is enabled, the network controller 105 determines whether the received data is print data, so that the preparation operation of the printer unit 20 can be executed in advance before the controller 60 generates the print job. Therefore, printing based on the print job can be started promptly because the preparation operation is executed in advance.

Figure 7B:
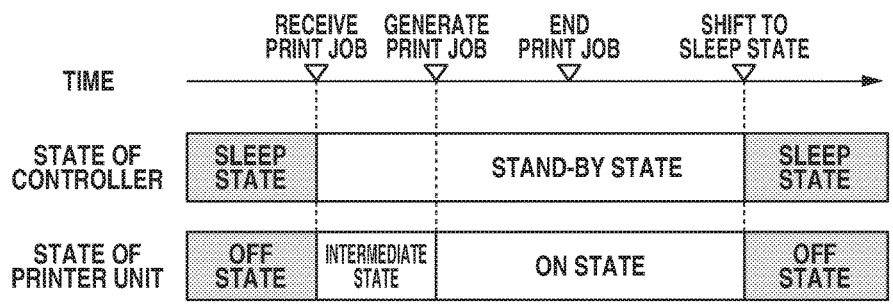

Operation when Printing Prediction Return Function and Forcible Reservation Function are Disabled FIG. 7B is a time chart of an operation when the printing prediction return function and the forcible reservation function are disabled.

In the time chart of FIG. 7B, the print data is received from the external apparatus 2 when the printing apparatus 1 is in the power saving state. When the printing apparatus 1 is in the power saving state, the controller 60 is in the sleep state whereas the printer unit 20 is in the OFF state.

When the network controller 105 receives the print data from the external apparatus 2, the controller 60 returns from the sleep state to become the stand-by state whereas the printer unit 20 becomes an intermediate state. The intermediate state is a state where the preparation operation of the printer unit 20 is not executed although power is supplied to the printer unit 20 and the printer controller 70. If power is supplied to the printer controller 70 in a state where the LIVEWAKE signal is input to the printer controller 70, the printer controller 70 does not execute the preparation operation of the printer unit 20. The above state is referred to as the intermediate state.

The controller 60 to which the power is supplied generates a print job based on the print data. When the print job is generated, the printer unit 20 executes the preparation operation, so as to become the ON state. When the printer unit 20 becomes the ON state, the printer unit 20 executes printing based on the print job. Then, if the shifting condition of the power saving state is satisfied, the printing apparatus 1 shifts to the power saving state.

When the printing prediction return function is disabled, the preparation operation of the printer unit 20 can be executed at a time point when the controller 60 generates the print job, i.e., at a time point when printing can be executed with certainty. With this configuration, execution of an unnecessary preparation operation of the printer unit 20 can be prevented.

Operation when Forcible Reservation Function is Enabled

Figure 7C:
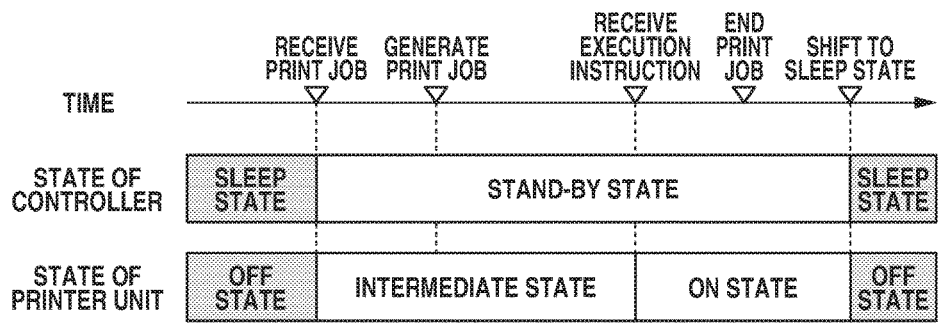

FIG. 7C is a time chart of an operation when the forcible reservation function is enabled.

In the present exemplary embodiment, the printing prediction return function is disabled when the forcible reservation function is enabled.

In the time chart of FIG. 7C, the print data is received from the external apparatus 2 when the printing apparatus 1 is in the power saving state. When the printing apparatus 1 is in the power saving state, the controller 60 is in the sleep state whereas the printer unit 20 is in the OFF state.

When the network controller 105 receives the print data from the external apparatus 2, the controller 60 returns from the sleep state to become the stand-by state whereas the printer unit 20 becomes the intermediate state. The controller 60 to which the power is supplied generates a print job based on the print data. When the forcible reservation function is enabled, the print job will not be executed unless the user provides the execution instruction, so that the print job is reserved in the printing apparatus 1.

After a while, when the user inputs the execution instruction via the operation unit 40, the preparation operation of the printer unit 20 is executed, so that the printer unit 20 becomes the ON state. Then, the printer unit 20 that has executed the preparation operation executes printing based on the print data.

When the forcible reservation function is enabled, printing is started based on the execution instruction input by the user via the operation unit 40, and thus the printed material can be prevented from being seen by the unspecified number of users. Further, when the forcible reservation function is enabled, execution of an unnecessary preparation operation of the printer unit 20 can be prevented by disabling the printing prediction return function.

Operation of Network Controller 105

Figure 8:
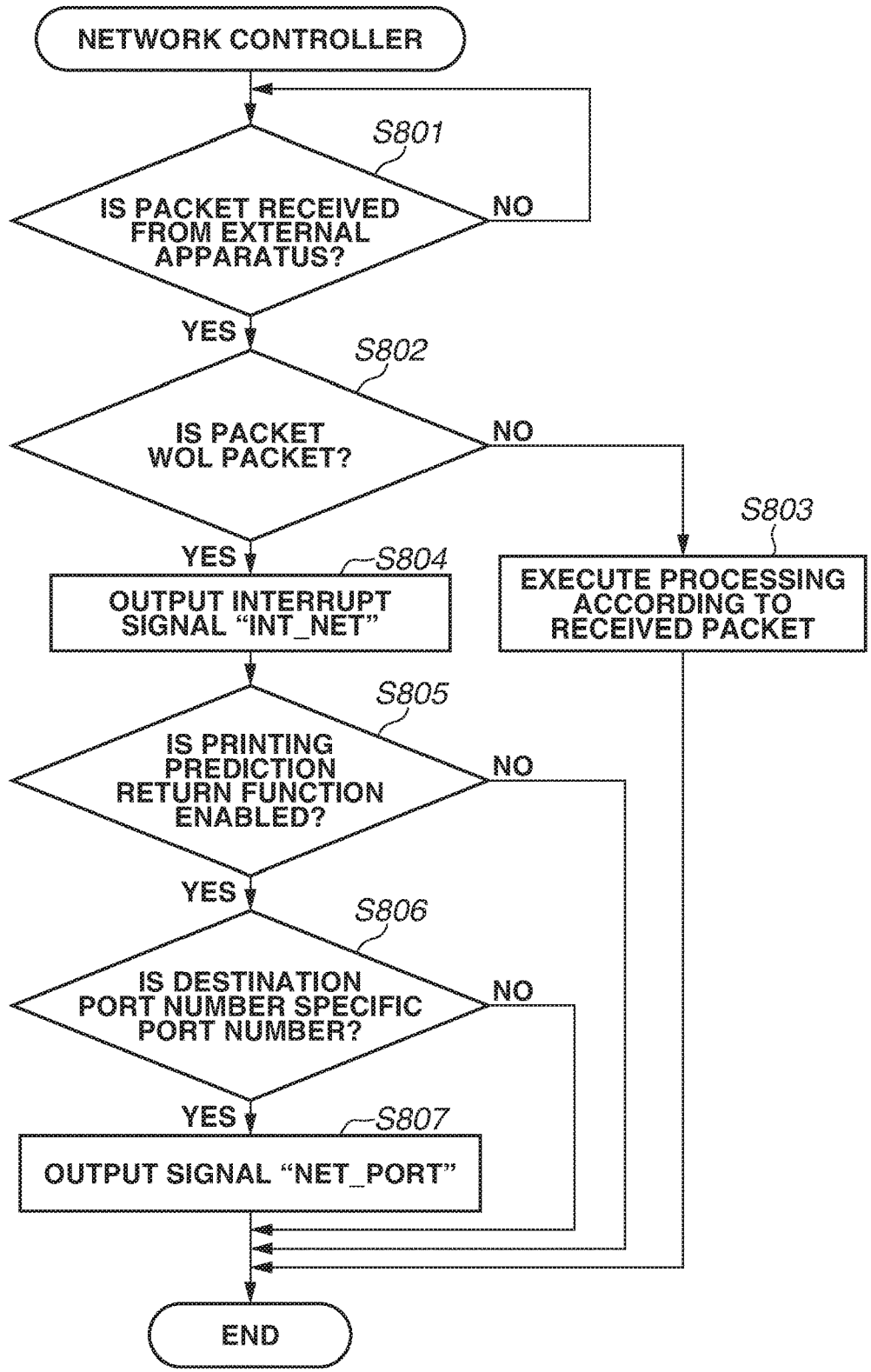
FIG. 8 is a flowchart illustrating an operation of a network controller.

An operation of the network controller 105 will be described with reference to FIG. 8.

When the network controller 105 receives a packet from the external apparatus 2 via the LAN 3 (YES in step S801), the processing proceeds to step S802. In step S802, the network controller 105 determines whether the packet is the WOL packet. A WOL packet pattern is previously registered in the network controller 105, so that the network controller 105 determines whether the received packet is the WOL packet by comparing the received packet with the WOL packet pattern. If the received packet is not the WOL packet (NO in step S802), the processing proceeds to step S803. In step S803, the network controller 105 executes processing according to the received packet. For example, if the received packet is a packet to which the network controller 105 can respond, the network controller 105 transmits a response to the received packet while the controller 60 is being held in the sleep state. Further, if the received packet is not the packet addressed to the printing apparatus 1, the network controller 105 discards the received packet.

If the received packet is the WOL packet (YES in step S802), the processing proceeds to step S804. In step S804, the network controller 105 outputs the interrupt signal INT_NET. Then, in step S805, the network controller 105 determines whether the printing prediction return function is enabled. If the printing prediction return function is disabled (NO in step S805), the processing with respect to the received packed is ended. On the other hand, if the printing prediction return function is enabled (YES in step S805), the processing proceeds to step S806. In step S806, the network controller 105 determines whether a destination port number specified by the received packet is a specific port number. Specifically, the network controller 105 determines whether the destination port specified by the received packet is a port 9100 for the RAW protocol. In addition, the network controller 105 can determine whether the destination port specified by the received packet is a port 515 for the LPR protocol.

If the destination port specified by the received packet is the port 9100 for the RAW protocol (YES in step S806), the processing proceeds to step S807. In step S807, the network controller 105 outputs the signal NET_PORT. By outputting the signal NET_PORT, the network controller 105 can notify the power control unit 109 that the received packet is the pint data. Because the signal NET_PORT is output by the network controller 105, the preparation operation of the printer unit 20 can be executed without waiting for activation of the controller 60. The time it takes the printer unit 20 to be ready for printing can be shorter than in a case where the preparation operation of the printer unit 20 is executed after waiting for completion of activation of the controller 60.

Operation of Power Control Unit 109

Figure 9:
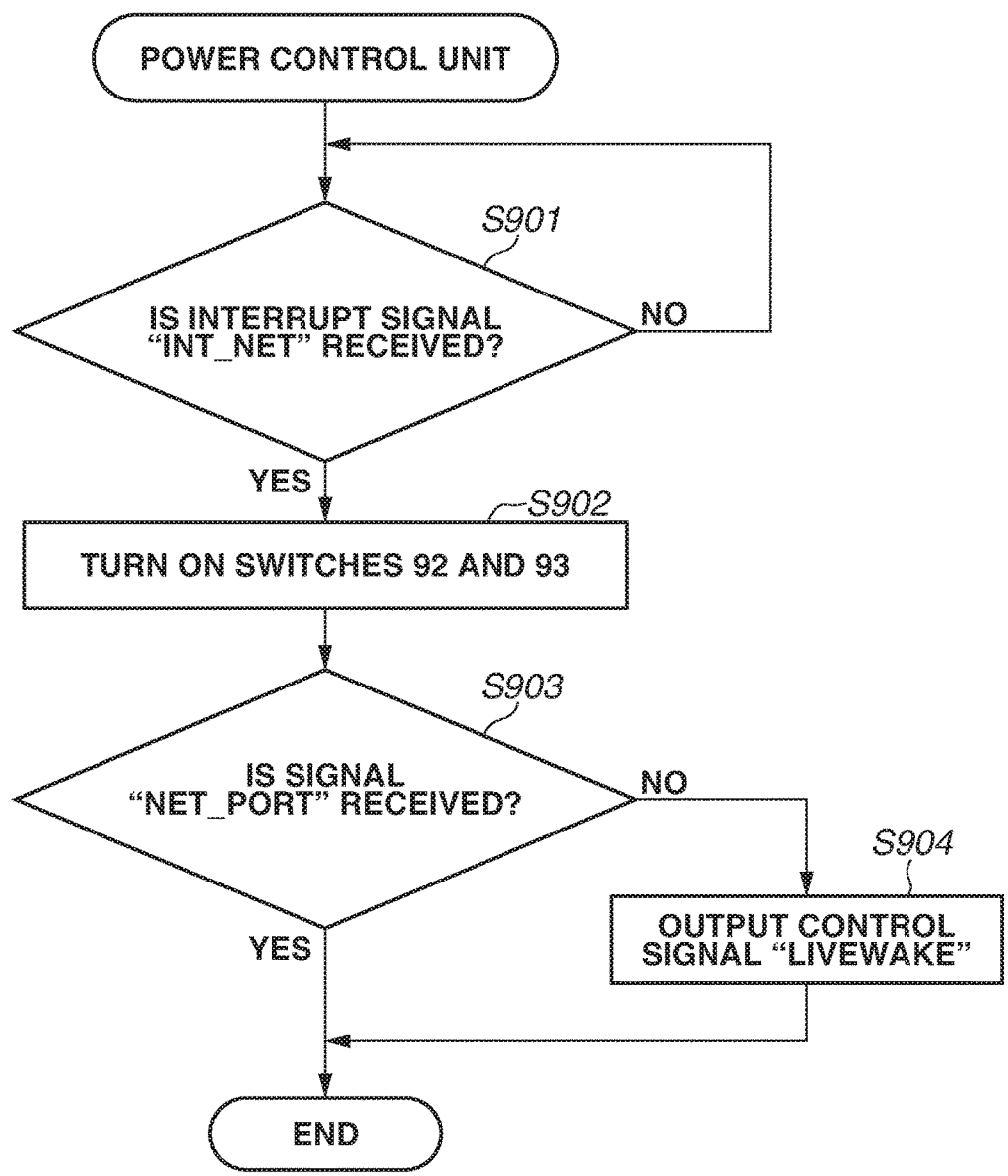
FIG. 9 is a flowchart illustrating an operation of a power control unit.

Next, an operation of the power control unit 109 to which the interrupt signal INT_NET is input will be described with reference to FIG. 9.

In step S901, when the interrupt signal INT_NET is input to the power control unit 109 (YES in step S901), the processing proceeds to step S902. In step S902, the power control unit 109 outputs the signals SW2 and SW3 to turn on the switches 92 and 93. At this time, in step S903, if the signal NET_PORT is input to the power control unit 109 (YES in step S903), the power control unit 109 does not output the LIVEWAKE signal. If the signal NET_PORT is not input to the power control unit 109 (NO in step S903), the processing proceeds to step S904. In step S904, the power control unit 109 outputs the LIVEWAKE signal.

When the network controller 105 receives the print data, the power control unit 109 causes the printer unit 20 to execute the preparation operation by not outputting the LIVEWAKE signal. Further, when the network controller 105 receives the WOL packet that is different from the print data, the power control unit 109 prevents the printer unit 20 from executing the preparation operation by outputting the LIVEWAKE signal.

Further, in the above-described exemplary embodiment, the power control unit 109 prevents the printing unit 20 from executing the preparation operation by outputting the LIVEWAKE signal to the printer controller 70. However, aspects of the present invention are not limited to the above configuration, and the power control unit 109 can prevent the printer unit 20 from executing the preparation operation by not turning on the switch 93. The preparation operation of the printer unit 20 can be executed by turning on the switch 93 when the print job is to be generated or execution of the print job is to be started by activating the controller 60.

Operation of Controller 60

Figure 10:
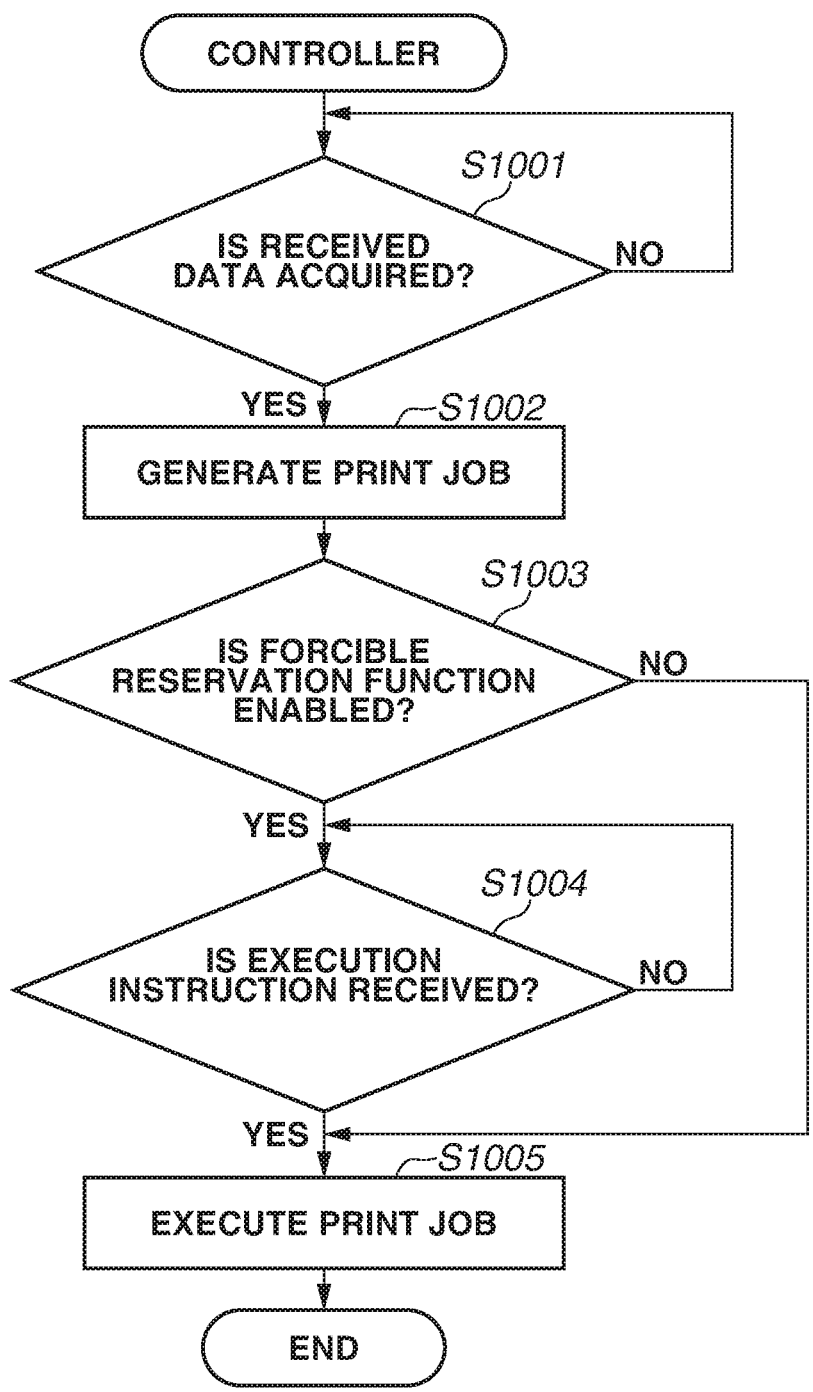
FIG. 10 is a flowchart illustrating an operation of a controller.

Next, an operation of the controller 60 (CPU 101) that has returned to the stand-by state will be described with reference to FIG. 10.

When the CPU 101 of the controller 60 that has returned to the stand-by state from the sleep state acquires print data stored in a buffer of the network controller 105 (YES in step S1001), the processing proceeds to step S1002. In step S1002, the CPU 101 generates a print job. Then, in step S1003, the CPU 101 determines whether the forcible reservation function is enabled. If the forcible reservation function is disabled (NO in step S1003), the processing proceeds to step S1005. In step S1005, the CPU 101 executes the print job.

On the other hand, if the forcible reservation function is enabled (YES in step S1003), the processing proceeds to step S1004. In step S1004, the CPU 101 wait until the execution instruction of the print job is input by the user. When the execution instruction of the print job is input by the user (YES in step S1004), the processing proceeds to step S1005. In step S1005, the CPU 101 executes the print job.

In the first exemplary embodiment, description has been given to the operation in which the network controller 105 determines whether the printing prediction return function is enabled. In a second exemplary embodiment, the power control unit 109 determines whether the printing prediction return function is enabled. Hereinafter, the second exemplary embodiment will be described in detail. The content similar to the first exemplary embodiment will be omitted as appropriate.

Operation of Network Controller 105

Figure 11:
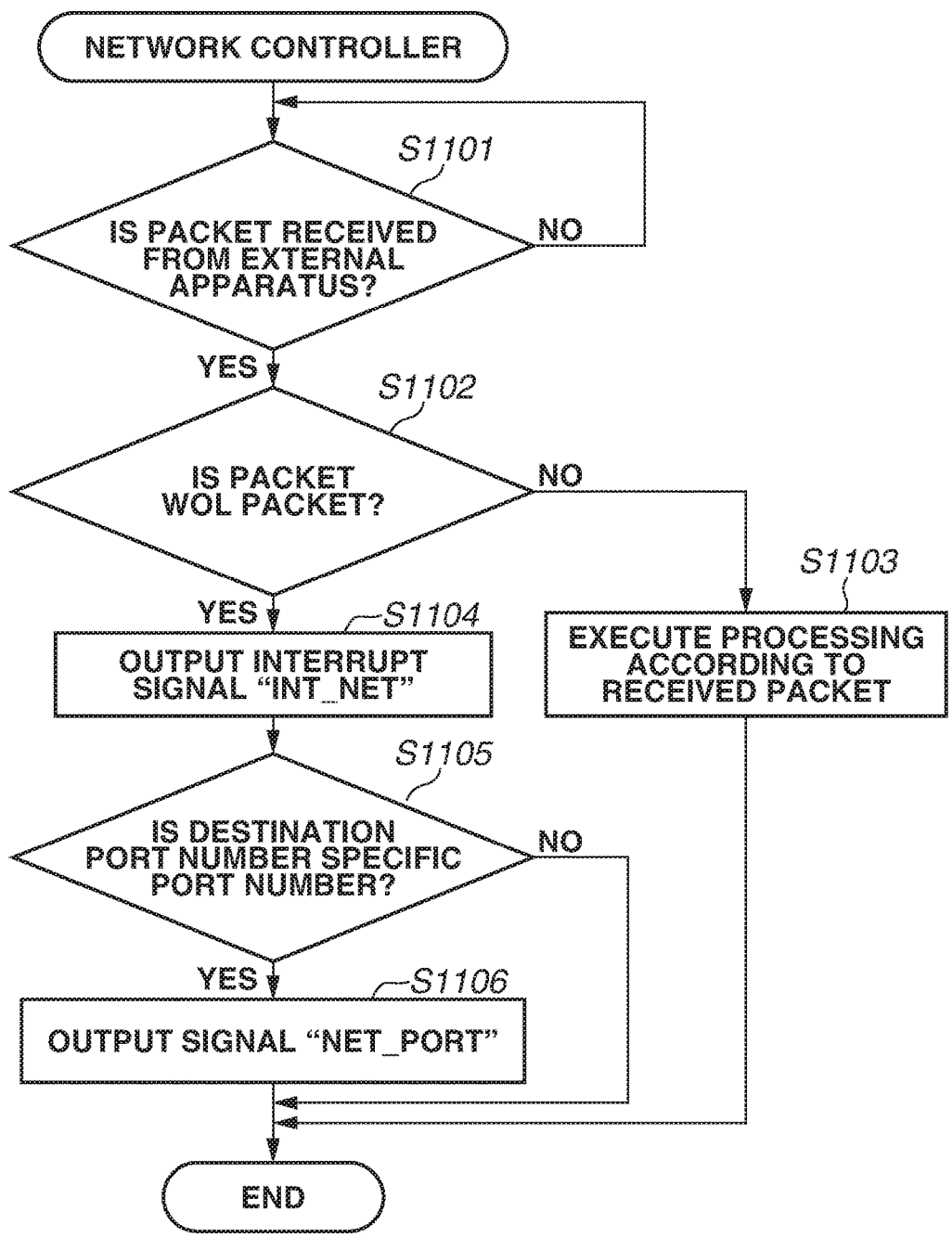
FIG. 11 is a flowchart illustrating an operation of a network controller according to a second exemplary embodiment.

FIG. 11 is a flowchart illustrating an operation of the network controller 105 according to the present exemplary embodiment.

In step S1101, when the network controller 105 receives a packet from the external apparatus 2 via the LAN (YES in step S1101), the processing proceeds to step S1102. In step S1102, the network controller 105 determines whether the packet is the WOL packet. If the received packet is not the WOL packet (NO in step S1102), the processing proceeds to step S1103. In step S1103, the network controller 105 executes processing according to the received packet.

If the received packet is the WOL packet (YES in step S1102), the processing proceeds to step S1104. In step S1104, the network controller 105 outputs the interrupt signal INT_NET. Then, in step S1105, the network controller 105 determines whether a destination port number specified by the received packet is a specific port number. If the destination port number specified by the received packet is the specific port number (YES in step S1105), the processing proceeds to step S1106. In step S1106, the network controller 105 outputs the signal NET_PORT.

Operation of Power Control Unit 109

Figure 12:
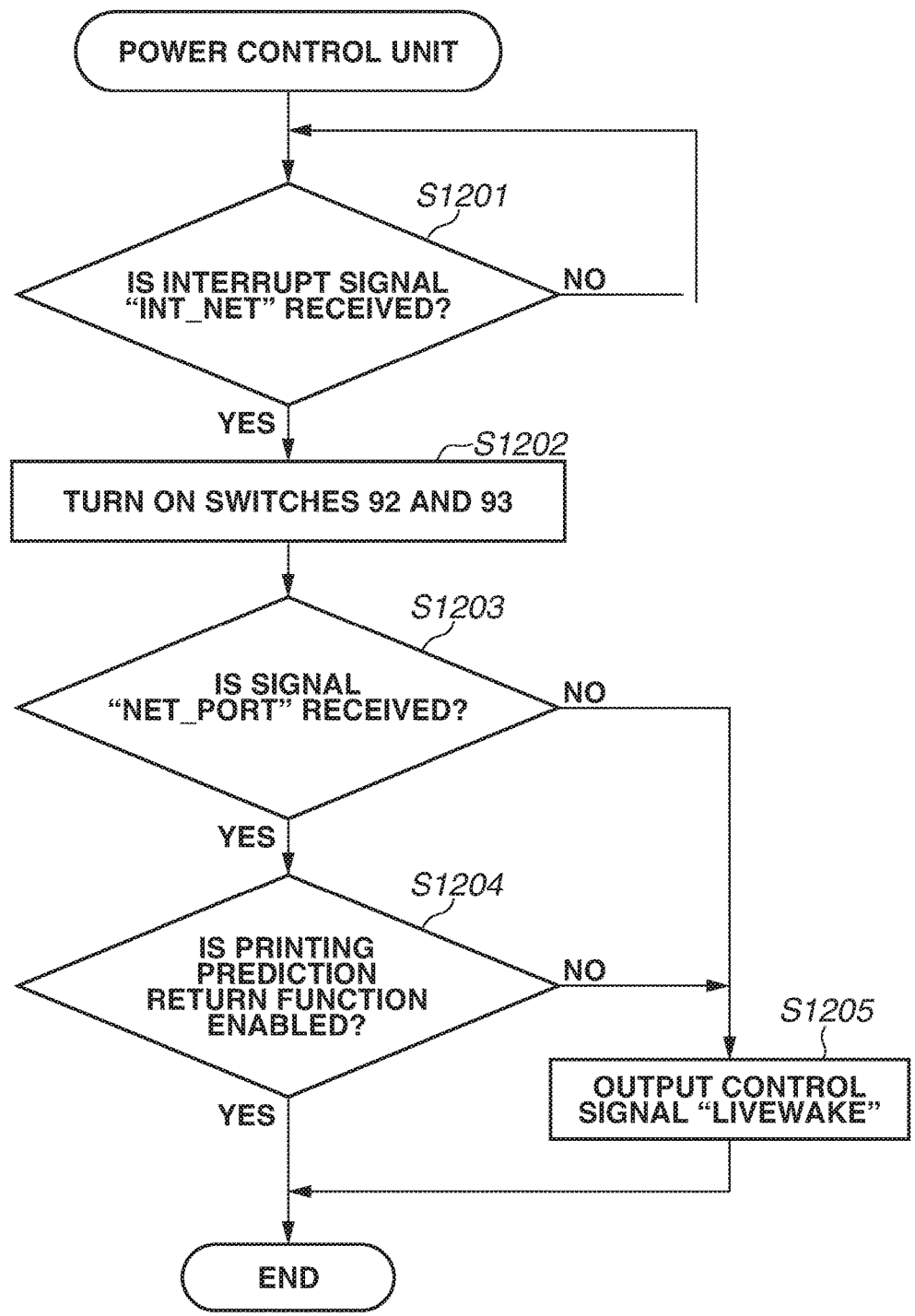
FIG. 12 is a flowchart illustrating an operation of a power control unit according to the second exemplary embodiment.

Next, an operation of the power control unit 109 to which the interrupt signal INT_NET is input will be described with reference to FIG. 12.

In step S1201, when the interrupt signal INT_NET is input to the power control unit 109 (YES in step S1201), the processing proceeds to step S1202. In step S1202, the power control unit 109 outputs the signals SW2 and SW3 to turn on the switches 92 and 93. Then, in the present exemplary embodiment, even if the signal NET_PORT is input to the power control unit 109 (YES in step S1203), if it is determined that the printing prediction return function is disabled (NO in step S1204), the power control unit 109 advances the processing to step S1205 and outputs the LIVEWAKE signal.

In the first exemplary embodiment, description has been given to the operation in which setting of the printing prediction return function is changed and the printing prediction return function is disabled when the forcible reservation function is enabled. In a third exemplary embodiment, the network controller 105 determines whether the forcible reservation function is enabled, and if it is determined that the forcible reservation function is enabled, the network controller 105 causes the printer unit 20 not to execute the preparation operation based on receipt of the print data. Although the third exemplary embodiment will be described below in detail, the content similar to the first exemplary embodiment will be omitted as appropriate.

Figure 13:
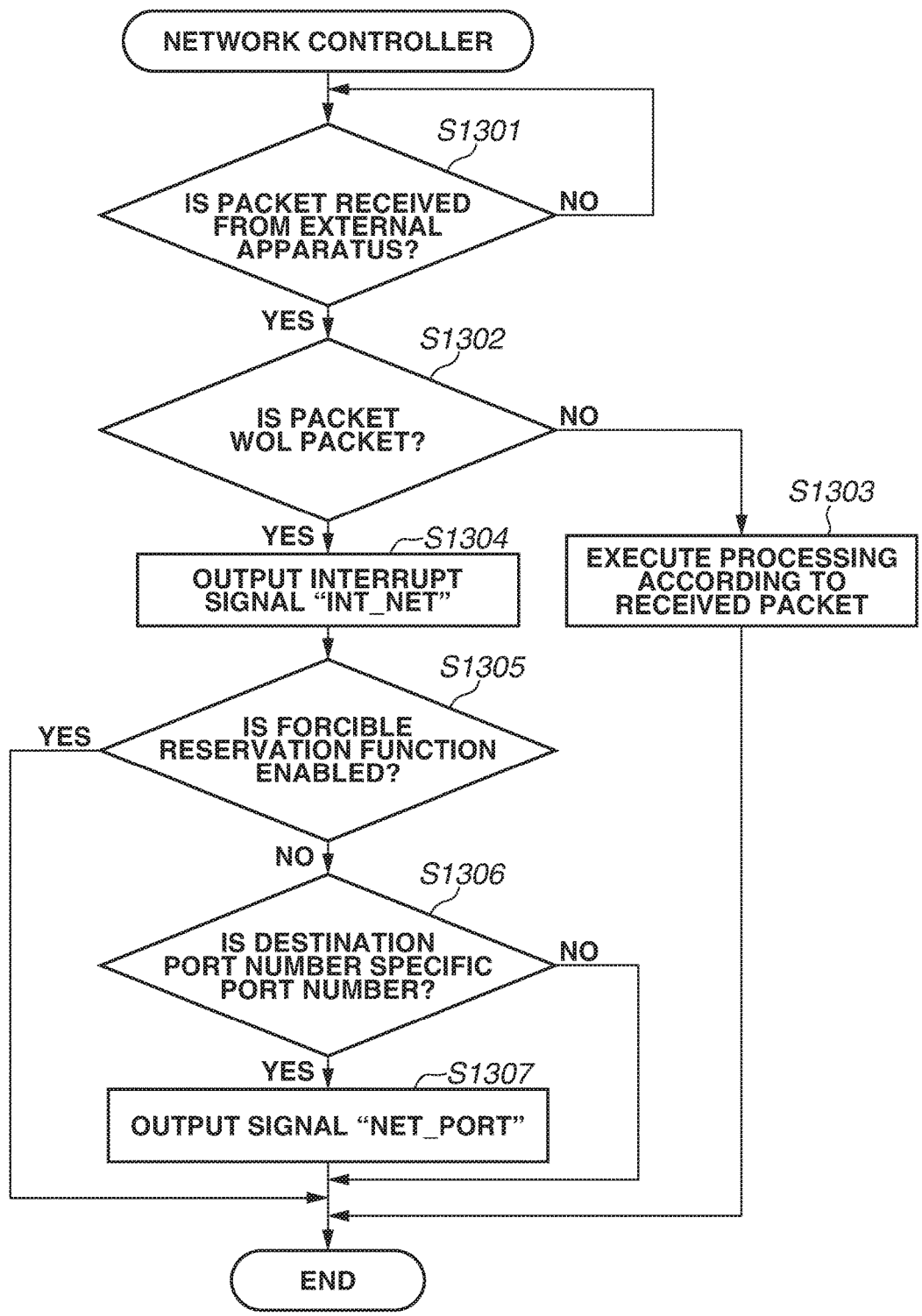
FIG. 13 is a flowchart illustrating an operation of a network controller according to a third exemplary embodiment.

An operation of the network controller 105 according to the present exemplary embodiment will be described with reference to FIG. 13.

In step S1301, when the network controller 105 receives a packet from the external apparatus 2 via the LAN (YES in step S1301), the processing proceeds to step S1302. In step S1302, the network controller 105 determines whether the packet is the WOL packet. If the received packet is not the WOL packet (NO in step S1302), the processing proceeds to step S1303. In step S1303, the network controller 105 executes processing according to the received packet.

If the received packet is the WOL packet (YES in step S1302), the processing proceeds to step S1304. In step S1304, the network controller 105 outputs the interrupt signal INT_NET. Then, in the present exemplary embodiment, in step S1305, the network controller 105 determines whether the forcible reservation function is enabled. If the forcible reservation function is enabled (YES in step S1305), the network controller 105 ends the processing with respect to the received packet without determining whether the destination port number of the received packet is the specific port number.

In the present exemplary embodiment, if the forcible reservation function is enabled (YES in step S1305), the signal NET_PORT is not input to the power control unit 109, and thus the printer unit 20 does not execute the preparation operation even if the network controller 105 receives the print data.

If the forcible reservation function is disabled (NO in step S1305), the processing proceeds to step S1306. In step S1306, the network controller 105 determines whether the destination port number specified by the received packet is the specific port number. If the destination port number specified by the received packet is the specific port number (YES in step S1306), the processing proceeds to step S1307. In step S1307, the network controller 105 outputs the signal NET_PORT.

In a fourth exemplary embodiment, description will be given to an operation in which the power control unit 109 determines whether the forcible reservation function is enabled. Hereinafter, the present exemplary embodiment will be described in detail. The content similar to the first exemplary embodiment will be omitted as appropriate.

Figure 14:
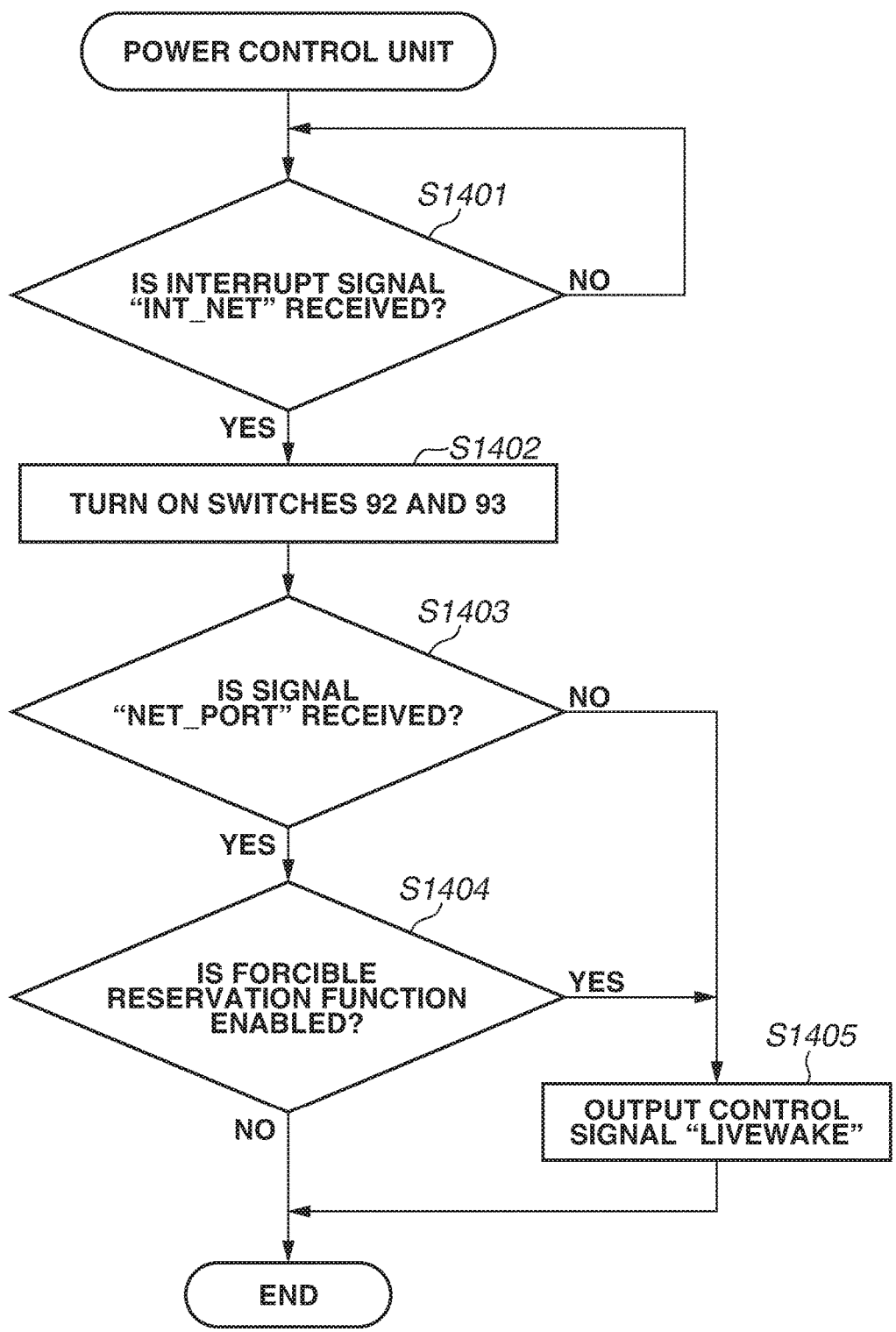
FIG. 14 is a flowchart illustrating an operation of a power control unit according to a fourth exemplary embodiment.

The operation of the power control unit 109 according to the present exemplary embodiment will be described with reference to FIG. 14.

In step S1401, when the interrupt signal INT_NET is input to the power control unit 109 (YES in step S1401), the processing proceeds to step S1402. In step S1402, the power control unit 109 outputs the signals SW2 and SW3 to turn on the switches 92 and 93. Then, in the present exemplary embodiment, even if the signal NET_PORT is input to the power control unit 109 (YES in step S1403), if it is determined that the forcible reservation function is enabled (YES in step S1404), the power control unit 109 advances the processing to step S1405 and outputs the LIVEWAKE signal. With this configuration, because the LIVEWAKE signal is input to the printer controller 70 when the forcible reservation function is enabled, the printer unit 20 does not execute the preparation operation even if the network controller 105 receives the print data.

In the above-described exemplary embodiments, although the MFP has been described as the printing apparatus, the printing apparatus does not have to include the scanning function or the facsimile function.

Other Embodiments

Embodiment(s) of the present invention can also be realized by a computer of a system or apparatus that reads out and executes computer executable instructions (e.g., one or more programs) recorded on a storage medium (which can also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer can comprise one or more processors (e.g., central processing unit (CPU), micro processing unit (MPU)) and can include a network of separate computers or separate processors to read out and execute the computer executable instructions. The computer executable instructions can be provided to the computer, for example, from a network or the storage medium. The storage medium can include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-138892, filed Jul. 10, 2015, which is hereby incorporated by reference herein in its entirety.

What is claimed is:

1. A printing apparatus, comprising:
a network interface configured to receive a print job from an external apparatus;
a printer configured to perform printing based on the print job received by the network interface;
a interface configured to set whether or not to hold the print job received by the network interface, wherein the printer performs the printing in accordance with a user operation received from a user in a case where it is set to hold the print job, and wherein the printer performs the printing without the user operation received from a user for the received print job in a case where it is set not to hold the print job; and
a power controller configured to, based on setting by the interface and a port number of the received print job, supply power to a predetermined device of the printer when the print job is received, wherein in a case where power is not supplied to the predetermined device of the printer when the print job is received, power is supplied to the predetermined device when a predetermined user instruction is received after receiving the print job.

2. The printing apparatus according to claim 1,
wherein the power controller does not supply power to the predetermined device when the print job is received but supplies power to the predetermined device when the predetermined user instruction is received after receiving the print job in the case where it is set by the interface to hold the print job, and wherein the power controller is able to supply power to the predetermined device when the print job is received in the case where it is set by the interface not to hold the print job.

3. The printing apparatus according to claim 1,
wherein the predetermined user instruction is a print execution instruction for the held print job.

4. The printing apparatus according to claim 1,
wherein the power controller supplies power to a predetermined device of the printer when the print job is received in a case where a first setting is set, or does not supply power to the predetermined device when the print job is received but supplies power to the predetermined device when predetermined user instruction is received after receiving the print job in a case where a second setting is set, and
wherein, in the case where it is set by the interface to hold the print job, the second setting is set.

5. The printing apparatus according to claim 4,
wherein, in the case where it is set by the interface not to hold the print job, the first setting is not set.

6. The printing apparatus according to claim 1,
wherein, in the case where it is set by the interface to hold the print job, the power controller supplies power to another predetermined device that is different from the predetermined device when the print job is received.

7. The printing apparatus according to claim 1,
wherein the predetermined device is any one of a fixing device, a polygon mirror, a fan, and a photosensitive member.

8. The printing apparatus according to claim 1,
wherein the network interface outputs a predetermined signal in a case where a destination port number of a received packet is a predetermined number, and
wherein, depending on the setting by the interface, the power controller supplies power to the predetermined device of the printer when the predetermined signal is received, or does not supply power to the predetermined device when the predetermined signal is received but supplies power to the predetermined device when predetermind user instruction is received after receiving the predetermined signal.

9. A method of controlling a printing apparatus including a printer configured to perform printing, comprising:
receiving, by a network interface, a print job from an external apparatus;
setting, by a interface, whether or not to hold the received print job, wherein printing is performed in accordance with a user operation from a user for the received print job in a case where it is set to hold the print job, and wherein printing is performed without any user operation from a user for the received print job in a case where it is set not to hold the print job; and
based on the setting and a port number of the received print job, supplying, by a power controller, power to a predetermined device of the printer when the print job is received, wherein in a case where power is not supplied to the predetermined device of the printer when the print job is received, power is supplied to the predetermined device when a predetermined user instruction is received after receiving the print job.

10. A printing apparatus, comprising:
a network interface configured to receive a print job from an external apparatus;
a printer configured to perform printing based on the print job received by the network interface;

a interface configured to set whether or not to hold the print job received by the network interface, wherein the printer performs the printing in accordance with a user operation from a user in a case where it is set to hold the print job, and wherein the printer performs the printing without the user operation from a user in a case where it is set not to hold the print job; and a power controller configured to, based on first setting, supply power to a predetermined device of the printer when the print job is received, or not to, based on second setting, supply power to the predetermined device when the print job is received but to supply power to the predetermined device when a predetermined user instruction is received after receiving the print job;

wherein the first setting is not set in the case where it is set to hold the print job.

11. The printing apparatus according to claim 10, wherein, in the case where it is set to hold the print job, the second setting is set.

12. The printing apparatus according to claim 10, wherein the predetermined user instruction is a print execution instruction for the held print job.

13. The printing apparatus according to claim 10, wherein, in the case where it is set by the interface to hold the print job, the second setting is set.

14. The printing apparatus according to claim 10, wherein, in the case where it is set by the interface not to hold the print job, the first setting is not changed.

15. The printing apparatus according to claim 10, wherein, in the case where it is set by the interface to hold the print job, the power controller supplies power to another predetermined device that is different from the predetermined device when the print job is received.

16. The printing apparatus according to claim 10, wherein the predetermined device is one of a fixing device, a polygon mirror, a fan, and a photosensitive member.

17. The printing apparatus according to claim 10, wherein the network interface outputs a predetermined signal in a case where a destination port number of a received packet is a predetermined number, and wherein, depending on the setting by the interface, the power controller supplies power to the predetermined device of the printer when the predetermined signal is received, or does not supply power to the predetermined device when the predetermined signal is received but supplies power to the predetermined device when predetermined user instruction is received after receiving the predetermined signal.

18. A method of controlling a printing apparatus, comprising:

receiving, by a network interface, a print job from an external apparatus;

setting, by a interface, whether or not to hold the received print job, wherein printing is performed in accordance with a user operation from a user for the received print job in a case where it is set to hold the print job, and wherein printing is performed without any user operation from a user for the received print job in a case where it is set not to hold the print job;

based predetermined first setting, supplying, by a power controller, power to a predetermined device of the printer when the print job is received; and based on second setting, not supplying power to the predetermined device when the print job is received but supplying, by the power controller, power to the predetermined device when predetermined user instruction is received after receiving the print job;

wherein the first setting is not set in the case where it is set to hold the print job.

* * * * *